US012188254B2

(12) United States Patent
Nguyen

(10) Patent No.: US 12,188,254 B2
(45) Date of Patent: Jan. 7, 2025

(54) INFLATABLE SPA LINER

(71) Applicant: BN BEAUTY SUPPLY LLC, Amory, MS (US)

(72) Inventor: Bet Thi Nguyen, Amory, MS (US)

(73) Assignee: BN BEAUTY SUPPLY LLC, Amory, MS (US)

( * ) Notice: Subject to any disclaimer, the term of this patent is extended or adjusted under 35 U.S.C. 154(b) by 0 days.

(21) Appl. No.: 18/385,846

(22) Filed: Oct. 31, 2023

(65) Prior Publication Data

US 2024/0141664 A1 May 2, 2024

Related U.S. Application Data

(60) Provisional application No. 63/421,303, filed on Nov. 1, 2022.

(51) Int. Cl.
*E04H 4/10* (2006.01)
*A61H 33/00* (2006.01)

(52) U.S. Cl.
CPC ......... *E04H 4/103* (2013.01); *A61H 33/6005* (2013.01)

(58) Field of Classification Search
CPC ...... A61H 35/006; A47K 3/001; A47K 3/002; A47K 1/06
See application file for complete search history.

(56) References Cited

U.S. PATENT DOCUMENTS 6,336,231 B1 * 1/2002 Smith .................... A47K 3/001 4/582
10,792,218 B2 * 10/2020 Ta ...................... A61H 33/6089
2004/0199994 A1 * 10/2004 Sherif .................... A47K 3/022 4/622

FOREIGN PATENT DOCUMENTS

CN 201197675 2/2009
DE 202006005241 U1 * 8/2006 ........... A61H 33/025

OTHER PUBLICATIONS

Translation (Year: 2024).*

* cited by examiner

*Primary Examiner* — Janie M Loeppke
(74) *Attorney, Agent, or Firm* — HULSEY P.C.

(57) ABSTRACT

An inflatable spa liner to be placed in a tub or spa pedicure bucket to prevent a user from contacting the surface of the tub is disclosed. The inflatable spa liner includes a first layer and a second layer that are sandwiched. The inflatable spa liner includes air channels formed at one of the first layer and the second layer. The air channels are arranged in between the first layer and the second layer. The inflatable spa liner is placed in a tub such that the first layer is in contact with the surface of the tub. The air channels inflate such that a user sitting in said inflatable spa liner contacting said second layer does not come in contact with the surface of said tub.

16 Claims, 4 Drawing Sheets

INFLATABLE SPA LINER

RELATED APPLICATIONS AND CLAIM FOR PRIORITY

The present application claims the benefit of U.S. Provisional Patent Application No. 63/421,303, with title of "Inflatable Spa Liner," and filed Nov. 1, 2022, which is incorporated herein by its entirety and referenced thereto.

TECHNICAL FIELD

The present disclosure relates to tub covers, and in particular, relates to an inflatable spa liner for single use to be placed in a tub to prevent users from contacting the surface of the tub, for preventing bacterial infection and disease spreading, as well as for general sanitation.

DESCRIPTION OF THE RELATED ART

It is known that a tub is a container used for holding water in which a user may bathe. Optionally, the tub is used for spa pedicure. The tub is difficult to maintain and at times, becomes slippery causing injuries to users. In order to overcome the above problems, the tub is covered with a tub liner. The tub liner includes sheets of Poly Vinyl Chloride (PVC) or acrylic molded in the shape of the tub. The tub liner provides a non-skid surface and results in fewer slips and falls.

An example of the tub liner is disclosed in a Chinese Patent Publication No. 201197675, entitled "Disposable bathtub cover" ("the '675 Publication"). The '675 Publication provides a disposable bathtub jacket which comprises a sack-shaped bathtub jacket body and a skirt edge. The sack-shaped jacket body is unfolded to be a cylindrical plastic container and provided with a cushion-shaped wear-resistant reinforcing rib net. The skirt edge is provided with an annular supporting device which is a plurality of water sacs for loading water, airbags for blowing the air or elastic steel wires. The water sac is an annular sac body arranged on the skirt edge of the upper end of the sack-shaped jacket body. The upper end of the sack-shaped jacket body is symmetrically provided with an outer cover. The sack-shaped jacket body, the skirt edge or the outer cover is provided with a fixing device. The utility model not only has simple structure and low production cost, but also maintains the advantage of convenient operation of a disposable bathtub jacket and improves the fixing mode of an instant bathtub jacket so as to achieve simpler structure and better effect, and the utility model provides the disposable bathtub jacket which has high value and is suitable for popularization and application.

Although the above discussed tub liner and other known tub liners are useful, they do not provide sufficient protection for the user, especially infants and/or elderly. Further, some of the tub liners have a rough design and use plastic pipes that are connected together. The plastic pipes are typically glued to the tub liner and air is pumped to the tub liner. There is a risk of the plastic pipes breaking and causing an injury to the users. Further, the plastic pipes have a certain length and cannot be folded. As a result, it is not easy to package or transport such tub liners. Moreover, the cost to manufacture and use prior known liners is higher because the labor because much or all of the work to do so is done by hand.

Therefore, there is a need in the art to provide a new and improved inflatable spa liner to be placed in a tub to prevent users from contacting the surface of the tub and avoid slipping and falling in the tub. Such an improved inflatable spa liner would possess the attractive properties and features of comfort, the ability to massage the user, improved sanitization, lower costs, and a single use application. As such an improved inflatable spa liner will aid in helping a nail technician to minimize the time to serve clients and clean up from service, as well as provide a work area that is easy to clean and with minimal maintenance.

SUMMARY

It is an object of the present invention to provide an inflatable spa liner that avoids the drawback of known tub covers/tub liners.

It is another object of the present invention to provide an inflatable spa liner to be placed in a tub to prevent users from contacting the surface of the tub.

In order to achieve one or more objects, the present invention provides an inflatable spa liner. The inflatable spa liner includes a first layer and a second layer that are sandwiched. The inflatable spa liner includes air channels formed at one of the first layer and the second layer. The air channels are arranged in between the first layer and the second layer. In one example, the air channels are crisscrossed and connected to each other and are evenly distributed. In another example, the air channels are distributed in a horizontal configuration, a vertical configuration or a combination thereof. Further, the air channels include an air intake channel. The air intake channel connects to the air channels. Furthermore, the inflatable spa liner includes an air distribution channel connecting the air intake channel and the air channels.

The inflatable spa liner is placed in a tub such that the first layer is in contact with the surface of the tub. The tub includes, but not limited to, a bathtub, a foot spa pedicure bucket, foot bath tub, foot wash basin, foot spa tub, etc. The air channels inflate such that a user sitting in said inflatable spa liner contacting said second layer does not come in contact with the surface of said tub.

In one advantageous feature of the present invention, the inflatable spa liner positions over the tub and prevents people such as babies or the elderly from being injured while taking bath. Optionally, the inflatable spa liner is positioned over the tub and used for spa pedicure. The inflatable spa liner provides great comfort, enhances the experience of using the tub, and provides an extra cushion layer for the client.

In another advantageous feature of the present invention, the inflatable spa liner presents unique air channels that are crisscrossed and connected to each other in an evenly distributed fashion in the middle of the film (bag body). When compared with traditional tub covers, which fill the air underneath entirely, the inflatable spa liner has the air channels positioned strategically at the center to fill the air. As the air channels take up much smaller area when compared to existing tub covers, the presently disclosed inflatable spa liner reduces the time to fill air in the air channels.

In another advantageous feature of the present invention, the inflatable spa liner is intended for single use has an elastic band at the edges. The elastic band presents an easy way to tighten and fix the inflatable spa liner around the tub.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention so as to enable those skilled in the art to practice the invention. Notably, the FIGURES and examples are not meant to limit the scope of the present invention to a single embodiment, but other embodiments are possible by way of interchange of some or all of the described or illustrated elements and, further, wherein.

DETAILED DESCRIPTION

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed inflatable spa liner. However, it will be apparent to those skilled in the art that the presently disclosed invention may be practiced without these specific details. In some instances, well-known structures and devices are shown in functional or conceptual diagram form in order to avoid obscuring the concepts of the presently disclosed inflatable spa liner.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of an inflatable spa liner, it is to be further understood that numerous changes may arise in the details of the embodiments of the inflatable spa liner. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Various features and embodiments of an inflatable spa liner to be placed in a tub to prevent users from contacting the surface of the tub are explained in conjunction with the description of FIGUREs (FIGS. 1-5.

Figure 1:
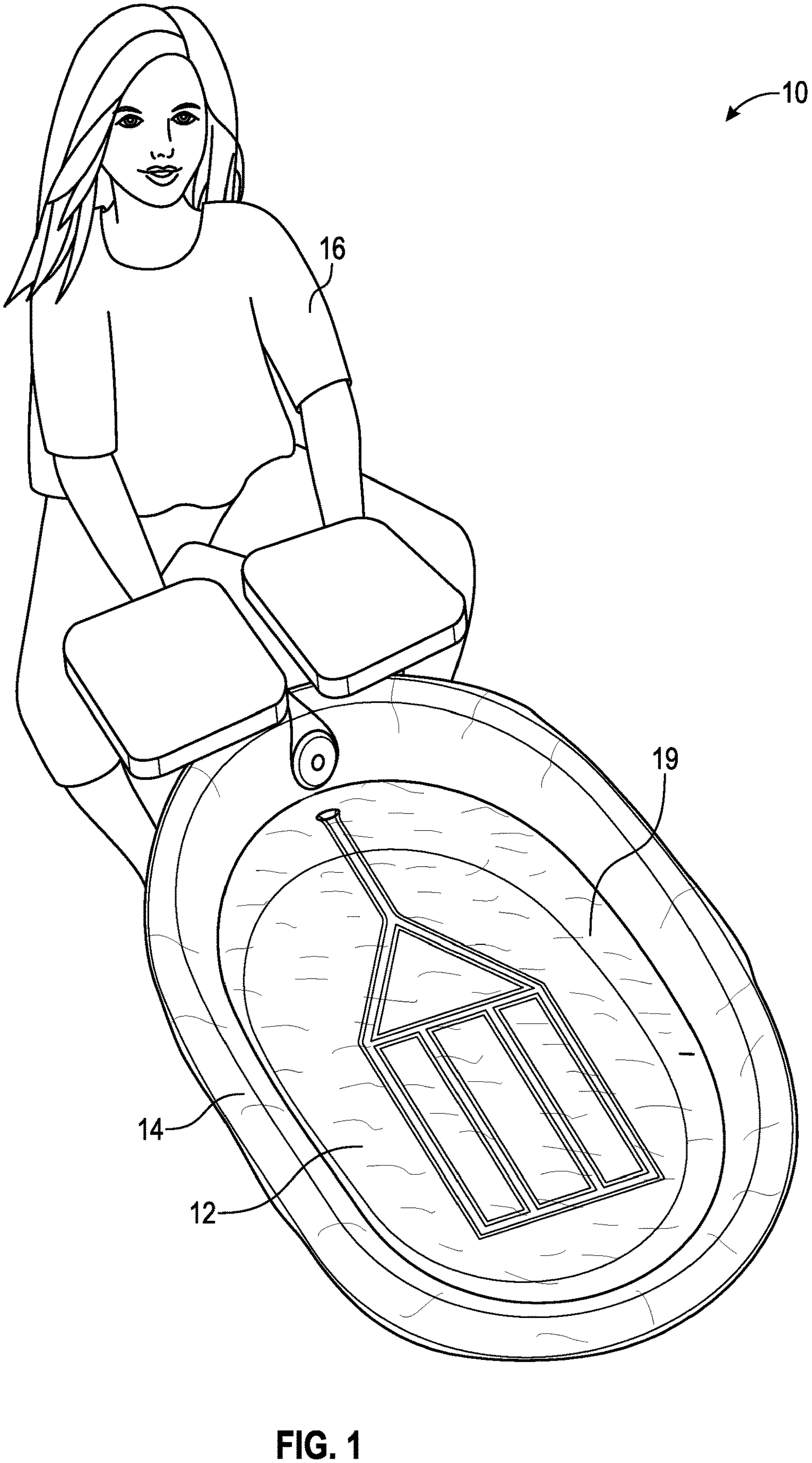
FIG. 1 illustrates an environment in which an inflatable spa liner implements in a tub, in accordance with one embodiment of the present invention.

FIG. 1 shows an environment 10 in which an inflatable spa liner 12 implements, in accordance with one embodiment of the present invention. Inflatable spa liner 12 is also referred to as an inflatable bathtub liner or inflatable lining bag, etc. Inflatable spa liner 12 inserts in a tub 14 and provides required protection for infants or elderly or adults at the time of taking bath or during spa pedicure. In one example, tub 14 includes, but not limited to, bathtub, a foot spa pedicure bucket, foot bath tub, foot wash basin, foot spa tub, etc. A person skilled in the art understands that tub 14 can be used for bathing infants, tub 14. Optionally, tub 14 can be used as a pedicure tub for spa pedicure, manicure, etc., without departing from the scope of the present invention. In the embodiment illustrated in FIG. 1, a user 16 inserts inflatable spa liner 12 in tub 14. Tub 14 indicates a container for holding water in which user 14 takes bath or gives bath to other users, say infants or uses tub 14 for spa pedicure. Inflatable spa liner 12 includes a hose or air tube (not shown) that connects to a pump (not shown) to inflate inflatable spa liner 12 that is in contact with tub 14. Subsequently, water 19 is filled in inflatable spa liner 12 to present an air gap between the user and tub 14.

Figure 2:
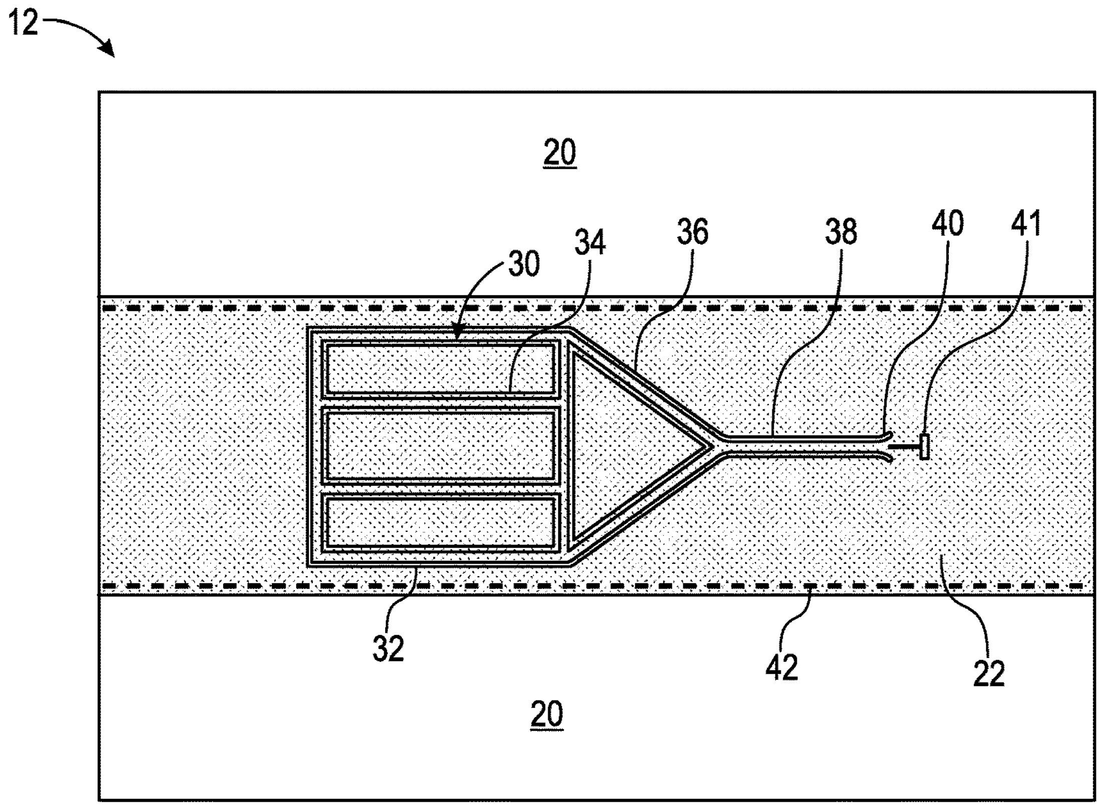
FIG. 2 illustrates a schematic diagram of the inflatable spa liner, in accordance with one embodiment of the present invention.
Figure 3:
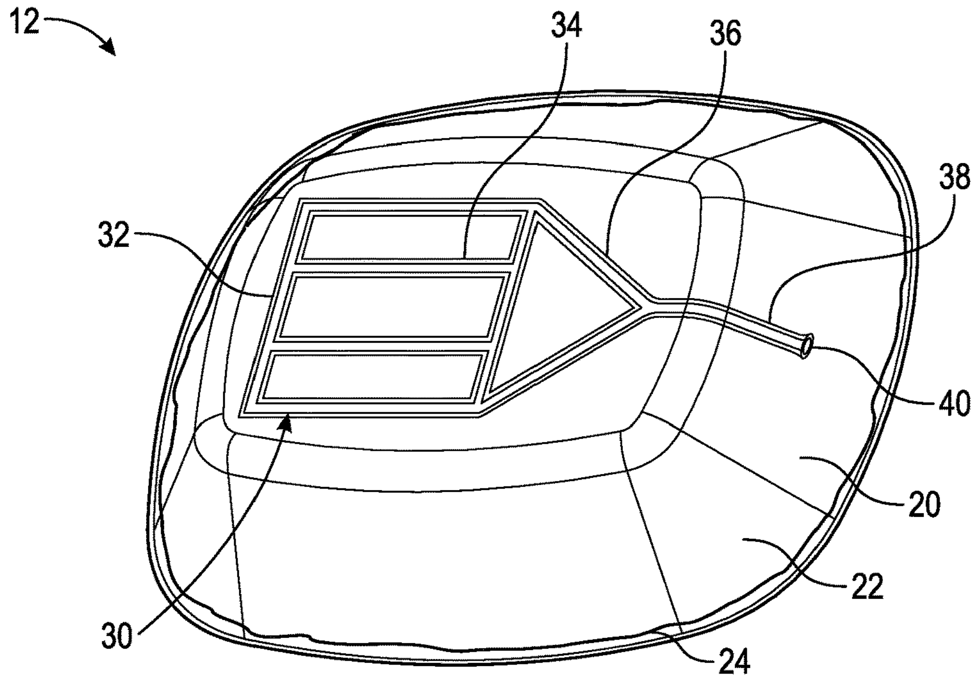
FIG. 3 illustrates a bottom perspective of the inflatable spa liner, in accordance with one embodiment of the present invention.
Figure 4:
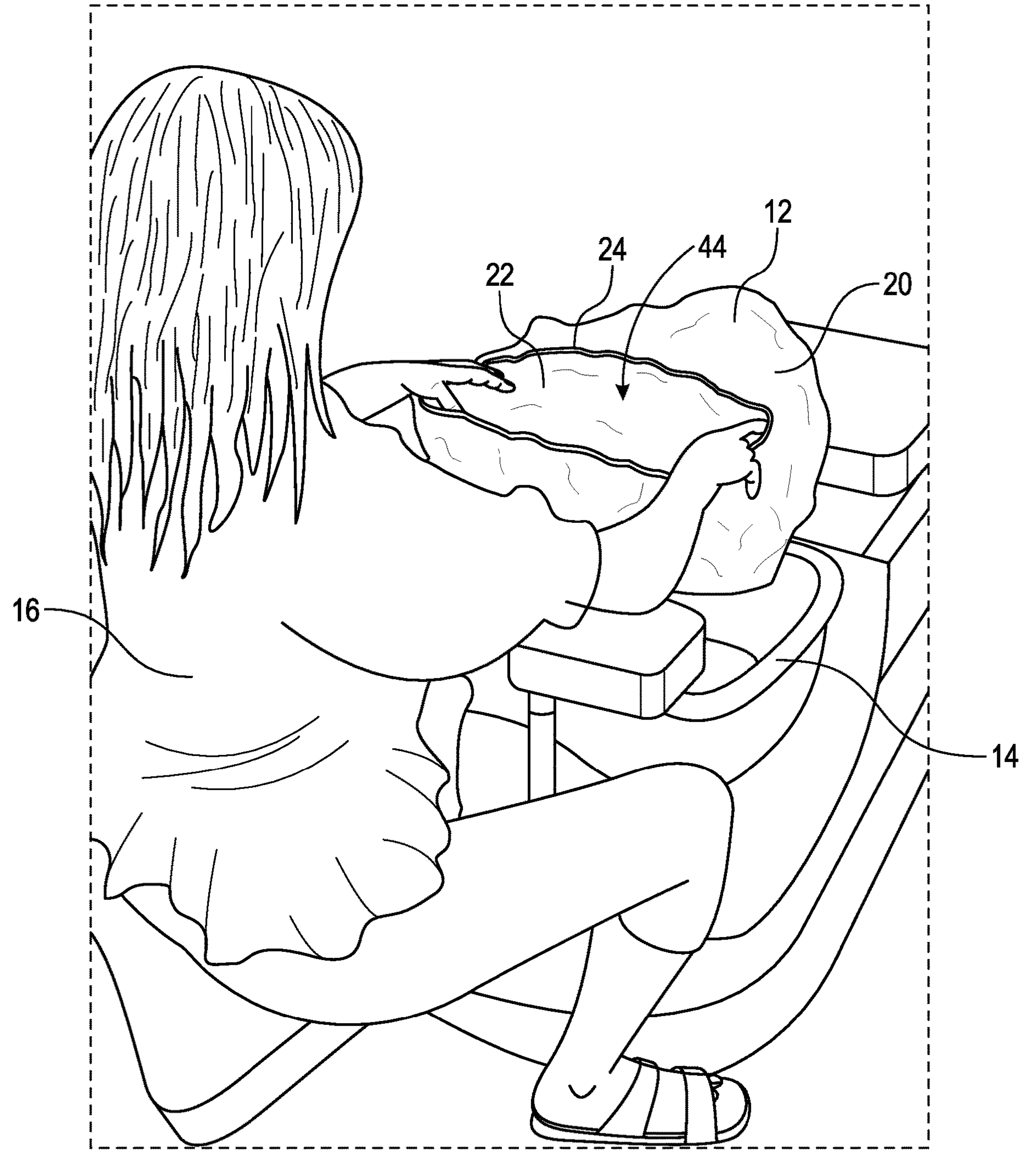
FIG. 4 illustrates the inflatable spa liner being put on the tub, in accordance with one embodiment of the present invention.

FIG. 2 shows a schematic diagram of inflatable spa liner 12, in accordance with one embodiment of the present invention. Further, FIG. 3 shows a rear perspective view of inflatable spa liner 12, in which inflatable spa liner 12 is expanded to fit to the shape of tub 14. Inflatable spa liner 12 includes a first layer or first film 20 and a second layer or second film 22. First layer 20 indicates a bottom layer and second layer 22 indicates a top layer. First layer 20 and second layer 22 are overlapped and joined together to form compressed layers (sandwiched layers). First layer 20 and second layer 22 include an elastic band 24 at the edges or corners to help stretch and put around tub 14. First layer 20, second layer 22 and elastic band 24 form a bag body with an opening 44 at the top, as shown in FIG. 4. Elastic band 24 helps to stretch and connect the edges of inflatable spa liner 12 around tub 14 while the bag body sits adjoining the walls and bottom of tub 14, as shown in FIG. 1.

In one embodiment, first layer 20 is designed to be closed and second layer 22 is designed to be overlapped over first layer 20 and have air channels or conductive connections 30 formed therein between first layer 20 and second layer 22. FIG. 2 and FIG. 3 show the feature of air channels 30 formed in inflatable spa liner 12. Air channels 30 indicate air holes formed in second layer 22 and between first layer 20 and second layer 22 allowing air to be passed through them and present inflatable second layer 22 at the interior of tub 14.

Air channels 30 have a first section 32, a second section 34, a third section 36 and a fourth section 38. First section 32 indicates air channels formed in a rectangular, square, triangular, or any other configuration. Here, first section 32 comes in a suitable size to cover the bottom area of tub 14. Second section 34 indicates a plurality of air channels that form within first section 32 in a horizontal or vertical configuration. Second section 34 helps to cover the inner area of first section 32 and to cover the centre portion of tub 14 when inflatable spa liner 12 is placed over tub 14. Third section 36 indicates air channels formed to converge first section 36 and to connect them to a single fourth section 38. Fourth section 38 acts as an air intake channel and third section 36 acts as an air distribution channel.

A person skilled in the art understands that first section 32 and second section 34 consisting of rectangular configuration and horizontal and/or vertical channels form several (e.g., eight) intersecting horizontal and vertical groups, each evenly distributed for holding air within. In one example, air channels 30 are provided in a crisscrossed fashion interconnecting with each other. Here, air channels 30 are evenly distributed in a desired pattern to provide sufficient air layer with inflatable spa liner 12 without departing from the scope of the present invention. Fourth section 38 configures to supply the air to third section 36 which in turn supplies air to first section 32 and second section 34.

As can be seen from FIG. 2, air channels 30 present continuous air passageways and prevent any air gap from forming between fourth section 38, third section 36, second section 34 and first section 32. Fourth section 38 includes a tube opening 40 for connecting an air tube (not shown). In one example, tube opening 40 has a punch hole 41 for drawing the air tube and connecting the air tube to tube opening 40. A person skilled in the art understands that there is no air gap when the air tube connects to tube opening 40. This prevents the air from escaping through a connection point of the air tube and tube opening 40. Further, inflatable spa liner 12 presents a liner 42 at the edges, as shown in FIG. 2. In one exemplary embodiment, inflatable spa liner 12 presents a drain hole (not shown). The drain hole is configured to align with a drain hole of tub 14. After use, the drain hole at inflatable spa liner 12 may be opened to empty water 19 from inflatable spa liner 12 via the tub's drain hole.

Figure 5:
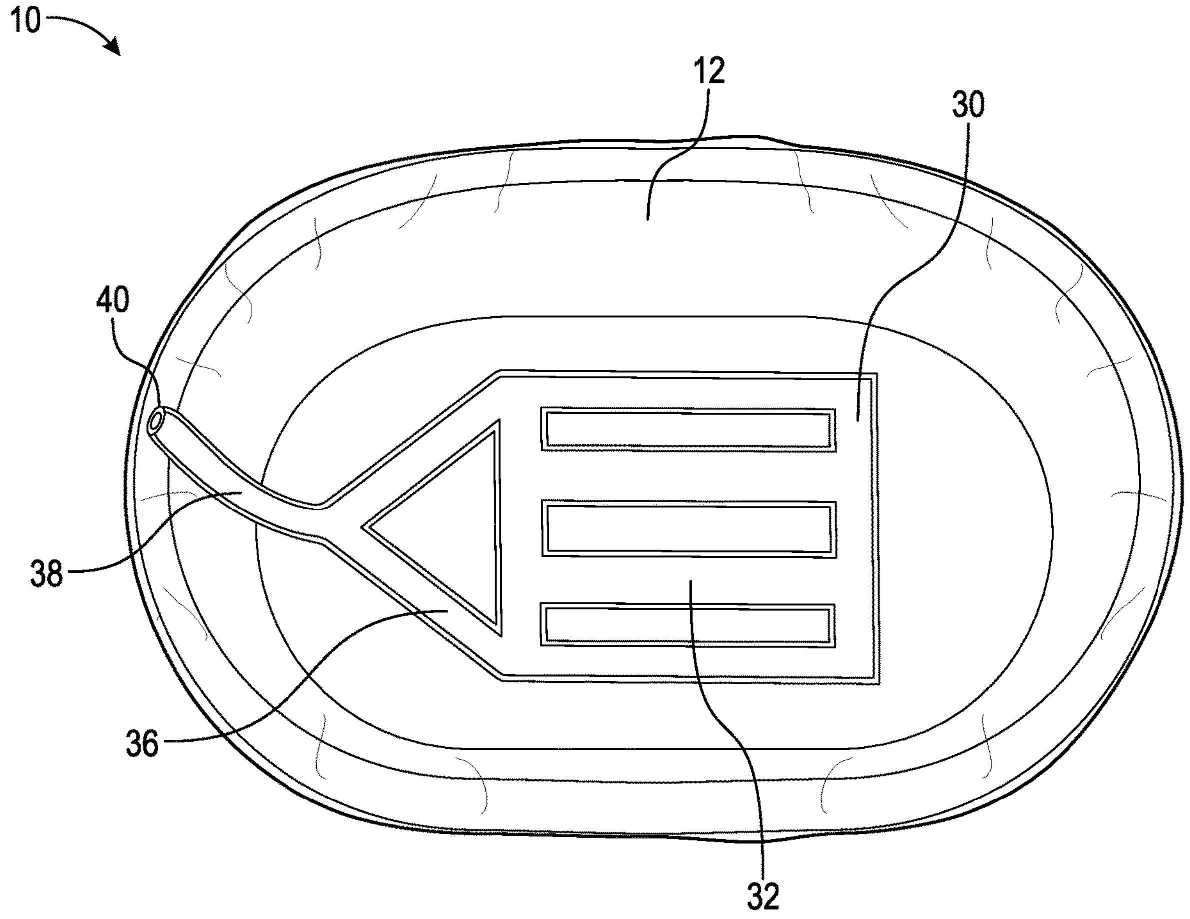
FIG. 5 illustrates the inflatable spa liner installed in the tub, in accordance with one embodiment of the present invention.

In order to place inflatable spa liner 12 in tub 14, user 16 stretches and puts inflatable spa liner 12 over tub 14, as shown in FIG. 4. After placing, user 14 pumps air into tube opening 40. Pumping air into tube opening 40 supplies air to air channels 30 and inflates them, as shown in FIG. 5. The inflated air channels 30 form an air layer such that when an infant is seated in inflatable spa liner 12, there is no direct contact between the infant and tub 14. The air layer formed due to inflated air channels 30 prevents the infant from collision and/or starches caused due to tub 14. Further, the air layer presents a cushion thereby the comfort and better experience for the infant. After inflating inflatable spa liner 12, water 19 is filled in opening 44 of inflatable spa liner 12 and making the infant sit in it.

Although the above description is explained considering that second layer 22 has air channels 30, it is possible to provide air channels 30 on first layer 20 alone or on both first layer 20 and second layer 22 in conductive connection manner without departing from the scope of the present invention.

The presently disclosed inflatable spa liner provides several advantages over the prior art. The inflatable spa liner removably attaches to the interior of the tub. The inflatable spa liner has two layers of films or sheets stacked over each other. The bottom layer has closed ends and top layer has air channels formed therein between the top and bottom layer. The air channels are connected to an air tube to inflate the air channels such that the user does not come in contact with the tub when being seated in the inflatable spa liner. Compared with the traditional spa liner, the user comfort is better, and the user experience is greatly improved.

A person skilled in the art appreciates that the inflatable spa liner can come in a variety of shapes and sizes depending on the need and comfort of the user. Further, many changes in the design and placement of components may take place without deviating from the scope of the presently disclosed inflatable spa liner.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. An inflatable bathtub cover, comprising:

a first layer, wherein said first layer indicates a bottom layer;

a second layer, wherein said second layer indicates a top layer, and wherein said first layer and said second layer are sandwiched; and air channels formed at one of said first layer and said second layer, wherein said air channels are arranged in between said first layer and said second layer, wherein said air channels comprise a first section, a second section, a third section and a fourth section, wherein said second section forms within said first section and presents intersecting horizontal and vertical configuration air channels, wherein said third section presents a triangular-shaped air channel converging said first channels, wherein said fourth section connects to said third section, and wherein said air channels present continuous air passageways and prevent any air gap from forming between said first section, said second section, said third section and said fourth section, wherein said inflatable bathtub cover is placed in a tub such that said first layer is in contact with a surface of said tub, and wherein an air tube is connected to said fourth section to supply air and inflate said fourth section, said third section, said second section and said first section of said air channels such that a user sitting in said inflatable bathtub cover contacting said second layer does not come in contact with the surface of said tub.

2. The inflatable bathtub cover of claim 1, wherein said first layer and said second layer form a bag body, and wherein said bag body comprises an elastic band at the edges for connecting said inflatable bathtub cover around said tub.

3. The inflatable bathtub cover of claim 1, wherein said air channels are crisscrossed and connected to each other and are evenly distributed.

4. The inflatable bathtub cover of claim 1, wherein said fourth channel indicates an air intake channel.

5. The inflatable bathtub cover of claim 4, wherein said second layer comprises a tube opening, and wherein said tube opening connects to said fourth channel.

6. The inflatable bathtub cover of claim 5, wherein said third section indicates an air distribution channel connecting said fourth section and said first section.

7. The inflatable bathtub cover of claim 1, wherein said air tube is connected to a pump to supply air to said air channels.

8. The inflatable bathtub cover of claim 1, wherein said second layer comprises a punch hole for drawing said air tube for connecting said air channels.

9. An inflatable bathtub cover, comprising:

a first layer, wherein said first layer indicates a bottom layer;

a second layer, wherein said second layer indicates a top layer, and wherein said first layer and said second layer are sandwiched; and air channels formed at said second layer, wherein said air channels are arranged in said first layer and said second layer, wherein said air channels comprise a first section, a second section, a third section and a fourth section, wherein said second section forms within said first section and presents intersecting horizontal and vertical configuration air channels, wherein said third section presents a triangular-shaped air channel converging said first channels, wherein said fourth section connects to said third section, and wherein said air channels present continuous air passageways and prevent any air gap from forming between said first section, said second section, said third section and said fourth section, wherein said inflatable bathtub cover is placed in a tub such that said first layer is in contact with a surface of said tub, and wherein an air tube is connected to said fourth section to supply air and inflate said fourth section, said third section, said second section and said first section of said air channels such that a user sitting in said inflatable bathtub cover contacting said second layer does not come in contact with the surface of said tub.

10. The inflatable bathtub cover of claim 9, wherein said first layer and said second layer form a bag body, and wherein said bag body comprises an elastic band at the edges for connecting said inflatable bathtub cover around said tub.

11. The inflatable bathtub cover of claim 9, wherein said fourth channel indicates an air intake channel.

12. The inflatable bathtub cover of claim 11, wherein said second layer comprises a tube opening, and wherein said tube opening connects to said fourth channel.

13. The inflatable bathtub cover of claim 12, wherein said third section indicates an air distribution channel connecting said fourth section and said first section.

14. The inflatable bathtub cover of claim 9, wherein said air channels are crisscrossed and connected to each other and are evenly distributed on said second layer.

15. A method of providing an inflatable bathtub cover, said method comprising the steps of:

providing a first layer, said first layer indicating a bottom layer;

providing a second layer, said second layer indicating a top layer;

sandwiching said first layer and said second layer;

forming air channels at one of said first layer and said second layer, said air channels being arranged in between said first layer and said second layer, said air channels comprising a first section, a second section, a third section and a fourth section, said second section forming within said first section and presenting intersecting horizontal and vertical configuration air channels, said third section presenting a triangular-shaped air channel converging said first channels, and said fourth section connecting to said third section, said air channels presenting continuous air passageways and preventing any air gap from forming between said first section, said second section, said third section and said fourth section;

placing said inflatable bathtub cover in a tub such that said first layer is in contact with a surface of said tub;

connecting an air tube to said fourth section to supply air and inflate said fourth section, said third section, said second section and said first section of said air channels such that a user sitting in said inflatable bathtub cover contacting said second layer does not come in contact with the surface of said tub.

16. The method of claim 15, further comprising:

connecting said air channels in a crisscrossed fashion; and distributing said air channels evenly across an entire area of said first layer and said second layer.

* * * * *